(12) United States Patent
Jung et al.

(10) Patent No.: US 6,621,807 B1
(45) Date of Patent: Sep. 16, 2003

(54) DEVICE AND METHOD FOR TRANSMITTING COMMON CHANNEL MESSAGE IN CDMA COMMUNICATION SYSTEM

(75) Inventors: Ki-Sung Jung, Kyonggi-do (KR); Hi-Chan Moon, Seoul (KR); Hyun-Seok Lee, Seoul (KR); Jae-Min Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/290,822

(22) Filed: Apr. 13, 1999

(30) Foreign Application Priority Data

Apr. 13, 1998 (KR) .............................. 98-13149

(51) Int. Cl.⁷ .............................................. H04B 7/216
(52) U.S. Cl. ....................... 370/335; 370/441; 370/328
(58) Field of Search ................................ 370/329, 335, 370/340–342, 431, 441, 328

(56) References Cited

U.S. PATENT DOCUMENTS 5,673,259 A * 9/1997 Quick, Jr. .................... 370/342
6,078,572 A * 6/2000 Tanno et al. ................. 370/335
6,347,091 B1 * 2/2002 Wallentin et al. ............ 370/437

FOREIGN PATENT DOCUMENTS

| JP | 01-011147 | 1/1989 |
| JP | 11-510667 | 9/1999 |
| WO | WO 97/46041 | 12/1997 |

OTHER PUBLICATIONS

Japanese Office Action dated Sep. 17, 2002 issued in a counterpart application, namely Japanese Appln. No. 11–551530.

* cited by examiner

Primary Examiner—Dwayne Bost
Assistant Examiner—Erika A. Gary
(74) Attorney, Agent, or Firm—Dilworth & Barrese, LLP

(57) ABSTRACT

A common channel message transmitting device and method in a CDMA communication system. In accordance with the method of the present invention, a mobile station (MS) sends a common channel message with a request for designation of a channel for transmission of a consecutive common channel message, and a base station (BS) sends a response message indicating an available channel ID for use by the MS, when one is available. If a channel ID is available, the MS sends the next message on a channel designated with the assigned channel ID.

24 Claims, 7 Drawing Sheets

DEVICE AND METHOD FOR TRANSMITTING COMMON CHANNEL MESSAGE IN CDMA COMMUNICATION SYSTEM

This application makes reference to, incorporates the same herein, and claims all benefits accruing under 35 U.S.C. §119 from an application entitled DEVICE AND METHOD FOR TRANSMITTING COMMON CHANNEL MESSAGE IN CDMA COMMUNICATION SYSTEM earlier filed in the Korean Industrial Property Office on Apr. 13, 1998, and there duly assigned Ser. No. 98-13149.

BACKGROUND OF THE INVENTION

1. Field of the Invention

The present invention relates generally to the field of wireless communication, and more particularly to a device and method for transmitting a common channel message in a CDMA (Code Division Multiple Access) communication system.

2. Description of the Related Art

In a communication system based on the TIA/EIA/IS-95 standard, messages are communicated between a base station (BS) and a mobile station (MS) generally on a forward paging channel and a reverse access channel which are common channels before a voice call is set up. For communication with the MS, the BS must transmit a message on the paging channel and receives a response on the access channel. From the mobile's perspective, for communication with the BS, the MS transmits a message on the access channel and receives a response on the paging channel. There can be a plurality of paging and access channels. Each paging channel is distinguished by a unique Walsh code, and each access channel by a long code generated with an access channel long code mask.

The MS transmits common channel messages on an access channel at a predetermined power level and awaits an acknowledgement from the BS. However, this common channel message transmission is susceptible to message contention if other mobile stations (MSs) are using the same access channel, resulting in a reception failure in the BS. If the MS fails to receive the acknowledgement within a predetermined time, it retransmits the access channel message at a power level incremented by a specified amount and awaits an acknowledgement from the BS.

In the case where the message is too long to be sent at one time, it should be divided into appropriate segments prior to transmission by repeating the above procedure. FIG. 1 is a flowchart illustrating a conventional message exchange when a message cannot be sent at one time and is therefore divided into segments for transmission. In this method, the MS sends a message segment on an access channel and must access the access channel each time to send successive message segments.

In the conventional access channel communication method, if mobile stations (MSs) sharing the same long code simultaneously transmit messages on the access channel, a message contention occurs, resulting in a loss of the messages. This mechanism is generally referred to as contention-based random access.

In the event a message contention should occur on the access channel, the MS should re-attempt to transmit the message on the access channel. In this case, each MS transmits a message on the access channel using the long code commonly shared by the MSes, and if message contention should occur, the MS perceives the occurrence in a predetermined time and re-transmits a message transmission after a randomized time delay.

The MS initially attempts to access the BS, via the access channel, at a predetermined power level. When it fails to receive an acknowledgement from the BS, it performs the next attempt at a power level a specified amount higher than the previous attempt. If repeated attempts to access the access channel result in failures, the procedure starts again at the lowest predetermined power level.

In accordance with the conventional common channel message transmitting method, when the message length is too long to be sent at one time, message segments are transmitted on an access channel in successive time intervals. Therefore, in the situation where different MSs attempt to send messages on the access channel by a shared long code, message contention is a common occurrence, thereby incurring long delays in transmission of an access channel message. Hence, there exists a need for a method to enable a mobile station to rapidly transmit a common channel message.

SUMMARY OF THE INVENTION

An object of the present invention, as embodied and broadly described herein, is to provide a device and method for enabling an MS to rapidly transmit a common channel message in a CDMA communication system.

Another object of the present invention is to provide a device and method for enabling an MS to continuously transmit a common channel message on a designated channel if the common channel message is longer than a predetermined length, in a CDMA communication system.

A further object of the present invention is to provide a device and method for enabling an MS to continuously transmit a common channel message on a channel temporarily designated as dedicated in a CDMA communication system.

Still another object of the present invention is to provide a device and method for enabling an MS to transmit the first segment of a common channel message exceeding a predetermined length on a common channel and the following segments on a channel designated by a BS in a CDMA communication system, in order to prevent a message contention for the common channel.

To achieve the above objects, there is provided a common channel message transmitting device and method in a CDMA communication system. In the transmitting method, an MS sends a common channel message with a request for designation of a channel for transmission of a multi-segment common channel message, and a BS sends a response message having an available channel ID for the message received from the MS. Then, the MS analyzes the response message and sends the next message on a channel designated with the assigned channel ID.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
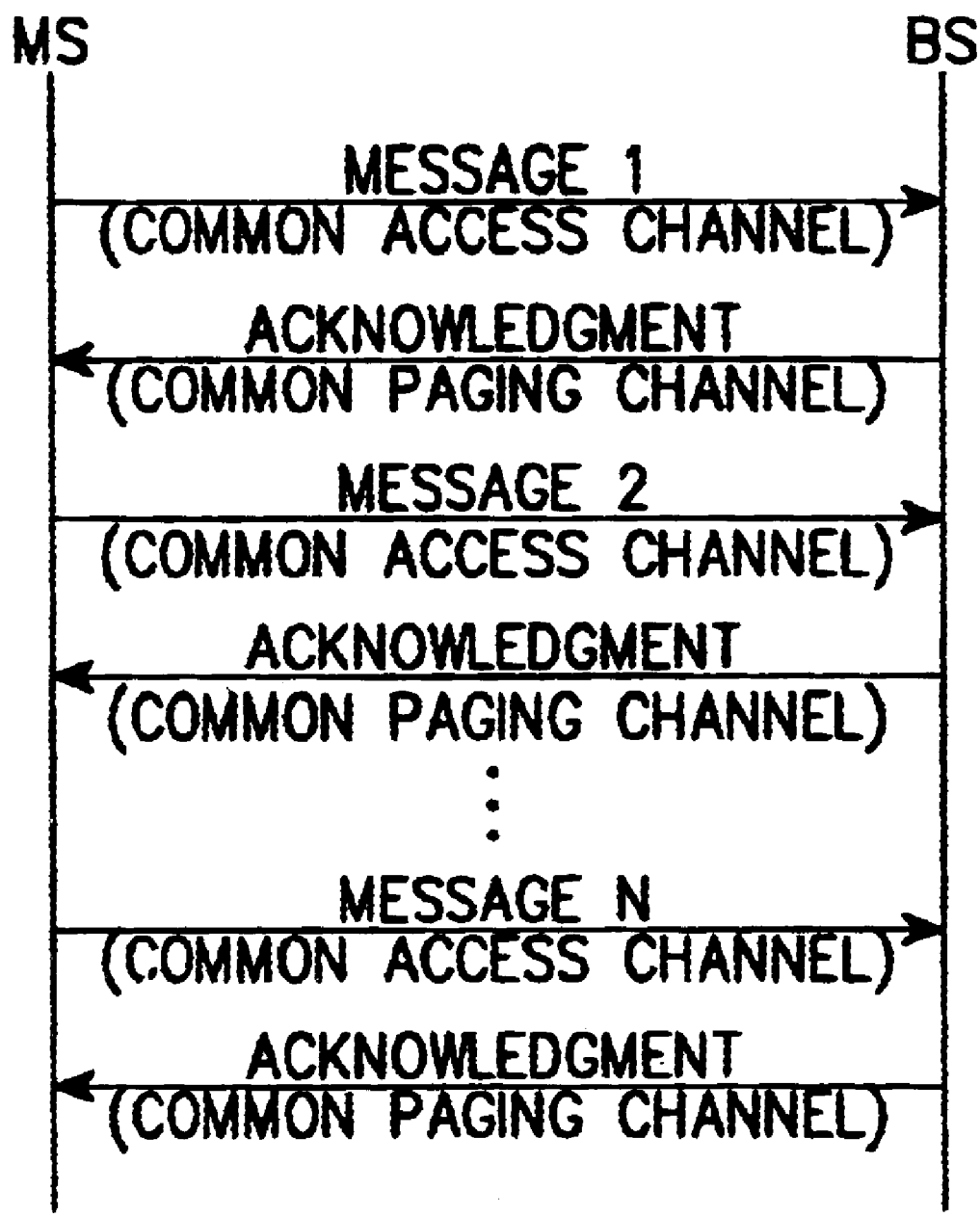
FIG. 1 illustrates the exchange of messages on common channels in a conventional communication system.

A preferred embodiment of the present invention will be described in detail with reference to the attached drawings. Like reference numerals denote the same components in the drawings.

Terms and Definitions

"channel identification (ID)": as used herein indicates the particular spreading code information of a common channel which can be temporarily designated as dedicated to allow an MS to send a reverse common channel message to a BS.

"spreading code information": is a general term used to refer to an access channel number, the ESN (Electronic Serial Number) of an MS, and a specific long code.

"access channel number": is used as part of a long code mask for an MS to send an access channel message to a BS on a channel temporarily designated as dedicated in order to avoid message collisions between MSs.

"spreading code using an ESN": refers to a public long code produced with the unique ESN of an MS.

"specific long code": is a long code prepared to prevent message contention. A channel ID is assumed to be the long code ID of a common channel which can be temporarily designated as dedicated to a specific MS or as semi-dedicated to a few MSes in the embodiment of the present invention.

"message flag": is a more message flag informing whether there are additional message segments following the current message segment.

"channel designation request flag": is used for an MS to request designation of a specific access channel as dedicated for transmission of an access channel message.

"channel designation flag": indicates whether a BS designates a common channel as designated in response to an MS request to do so.

If a reverse common channel message is too long to be sent at one time, an MS divides the message into appropriate segments for transmission. In the embodiment of the present invention, the MS sends the first segment of the message on a common access channel and all other segments on an access channel designated as dedicated by a BS, to thereby prevent collisions with other MSs which are simultaneously attempting to transmit on the access channel.

Figure 2:
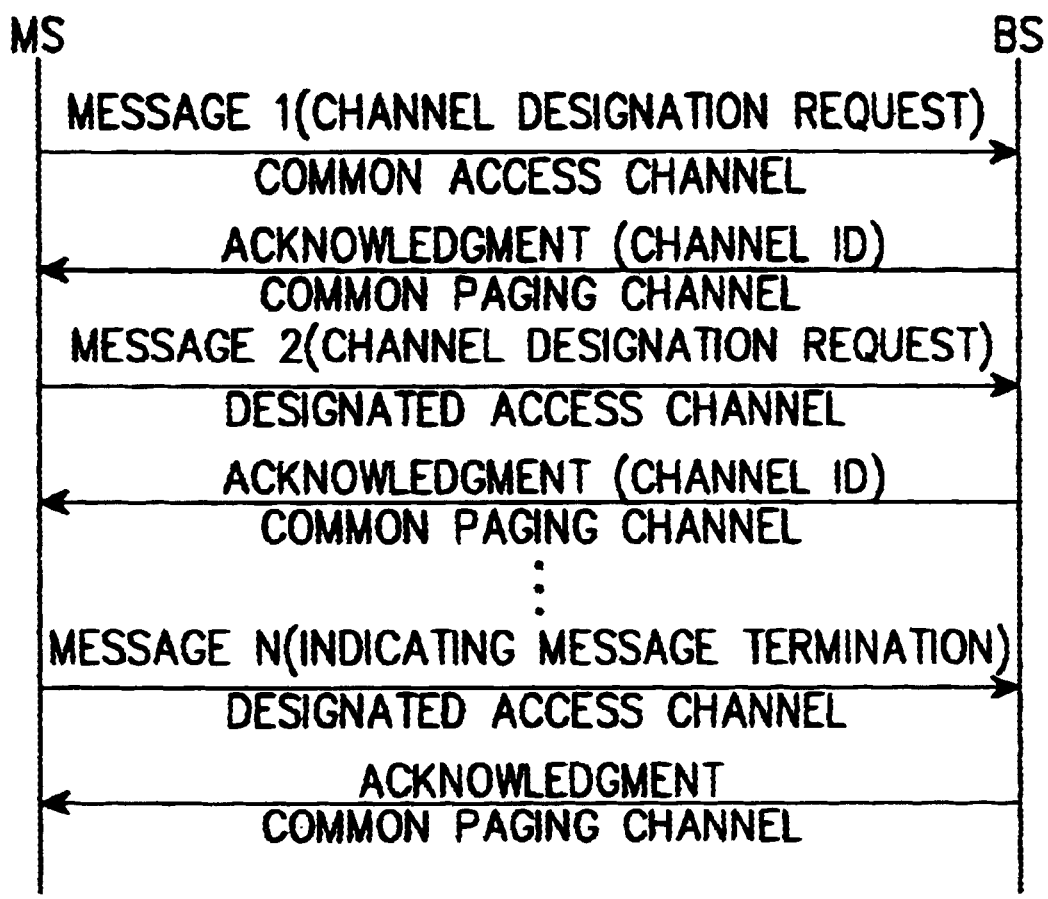
FIG. 2 illustrates the exchange of messages on common channels in a communication system according to an embodiment of the present invention.

FIG. 2 is a messaging flowchart of an MS operation for transmitting a message on a common access channel in a CDMA communication system according to an embodiment of the present invention.

Figure 3A:
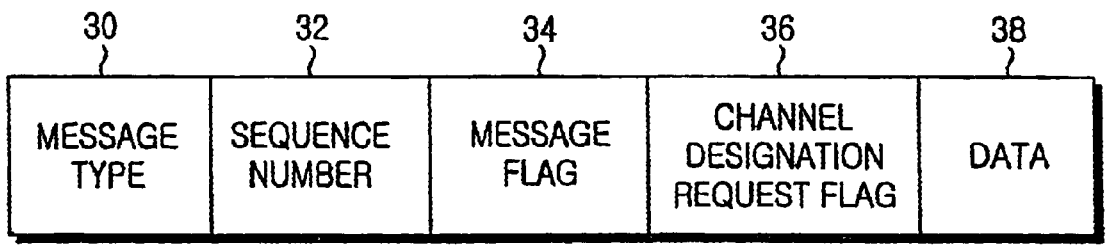
FIGS. 3A and 3B respectively illustrate the structures of an MS initiated message and a BS initiated message which are sent on common channels according to the embodiment of the present invention.
Figure 3B:
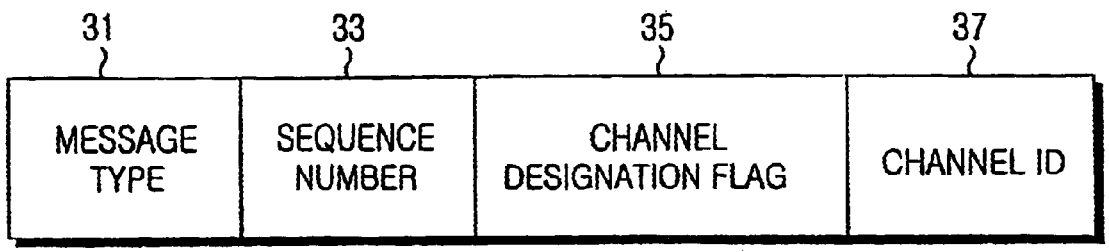

FIGS. 3A and 3B respectively illustrate the formats of an MS originated message to be transmitted on a common access channel and a BS originated control message to be transmitted on a common paging channel.

In FIG. 3A, a message format for transmitting a message on a common access channel includes a message type field (e.g., data or acknowledgement), a sequence number field indicates the number of a corresponding message when messages are consecutively transmitted, a message flag field represents the presence or absence of the next message, a channel designation request flag is used for an MS to request designation of a channel on which a message is sent, and a data field provides actual data to be transmitted. It is assumed here that when the message flag field is set it represents the presence of a subsequent message segment to send. It therefore follows that a cleared message flag field represents the absence of a subsequent message segment. It is also assumed that when the channel designation request flag is set, this indicates an MS request for designation of a channel on which to send a message, and a cleared channel designation request flag field 36 indicates no MS request for designation of the channel.

In response to the channel designation request, the channel used for channel designation may be selected by the BS as either a long code that a specific MS can use an access channel as dedicated, or an ESN for generating the long code. Hereinafter, a designated channel refers to a channel designated as dedicated to an MS for sending an access channel message to a BS.

In FIG. 3B, there is illustrated the structure of a BS generated control message to be transmitted to the MS on a common paging channel which includes a message type field 31 for indicating a message type (e.g., control message), a sequence number field 33 indicates the number of a received message when messages are consecutively received, a channel designation flag 35 represents whether a channel requested by the MS is designated or not depending upon its set or cleared status, and a channel ID field 37 provides the long code ID of an access channel designated as dedicated to a specific MS or as semi-dedicated to a few MSs.

Referring to FIGS. 2, 3A, and 3B, a method for transmitting a common access channel message exceeding a one-time transmissible length will be explained, the MS divides the message into a plurality of message segments and transmits the first message segment on a common access channel. Then, the MS requests designation of a channel to consecutively send all remaining message segments. The access channel message is constituted as shown in FIG. 3A. Upon reception of the first message segment on the reverse common access channel from the MS, the BS determines whether the message flag 34 and the channel designation request flag 36 is set. If both flags are set, the BS determines whether there is an available long code to designate an access channel as dedicated. If there is, the BS sends the MS a response message having a channel designation flag 35 set and the available long code ID 37, as shown in FIG. 3B, on a common paging channel.

Then, the MS sends the next message segment on the access channel designated with use of the long code ID assigned by the BS. If there are additional message segments, the message flag and the channel designation request flag of the current message segment are set in addition to the first segment transmitted on the designated access channel. It should be noted that the long code ID assigned by the BS can be identical to or different from a previously assigned channel ID. If there is no long code available for designation of an access channel as dedicated, a control message generated from the BS clears the channel designation flag. In this case, the MS must resort to selecting a common access channel again to send a remaining message segment.

In the above procedure, when the MS sends the last message segment, it clears the message flag field and the channel designation request flag field. Then, the BS generates a control message to clear the channel designation flag in response to receiving the last message segment.

Figure 4:
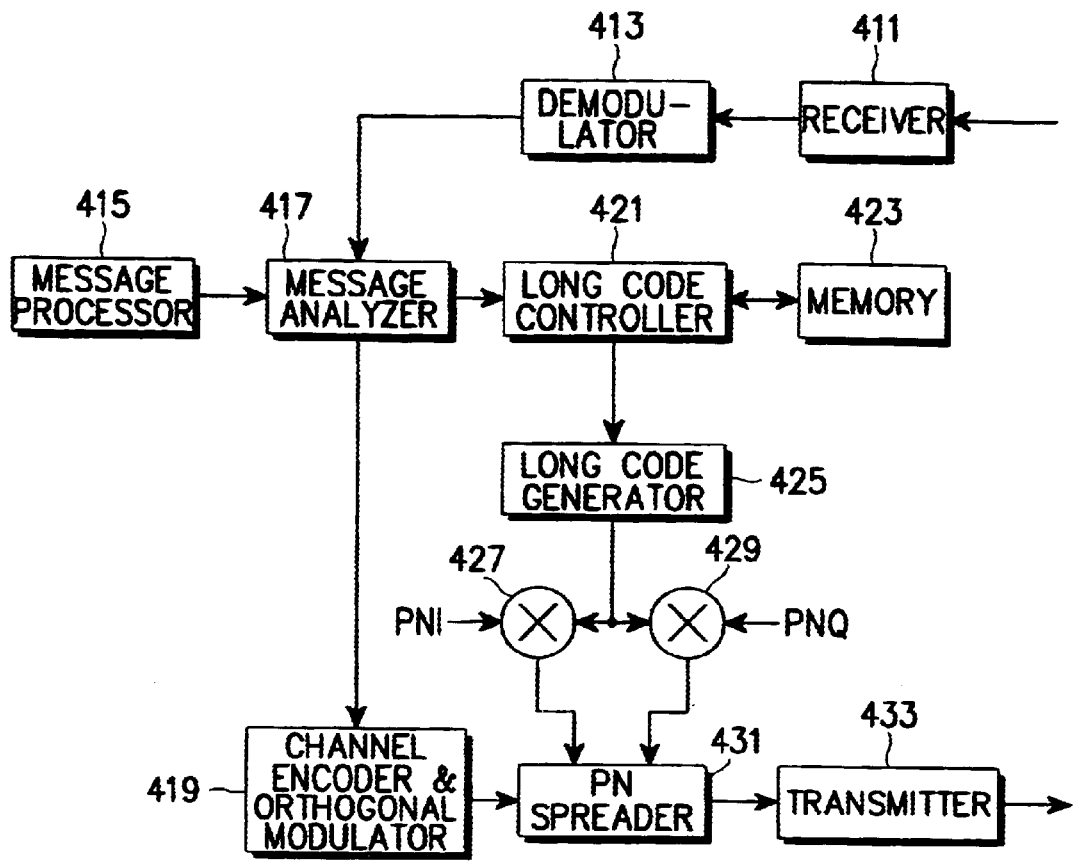
FIG. 4 is a block diagram of an MS in the communication system according to the embodiment of the present invention.
Figure 6:
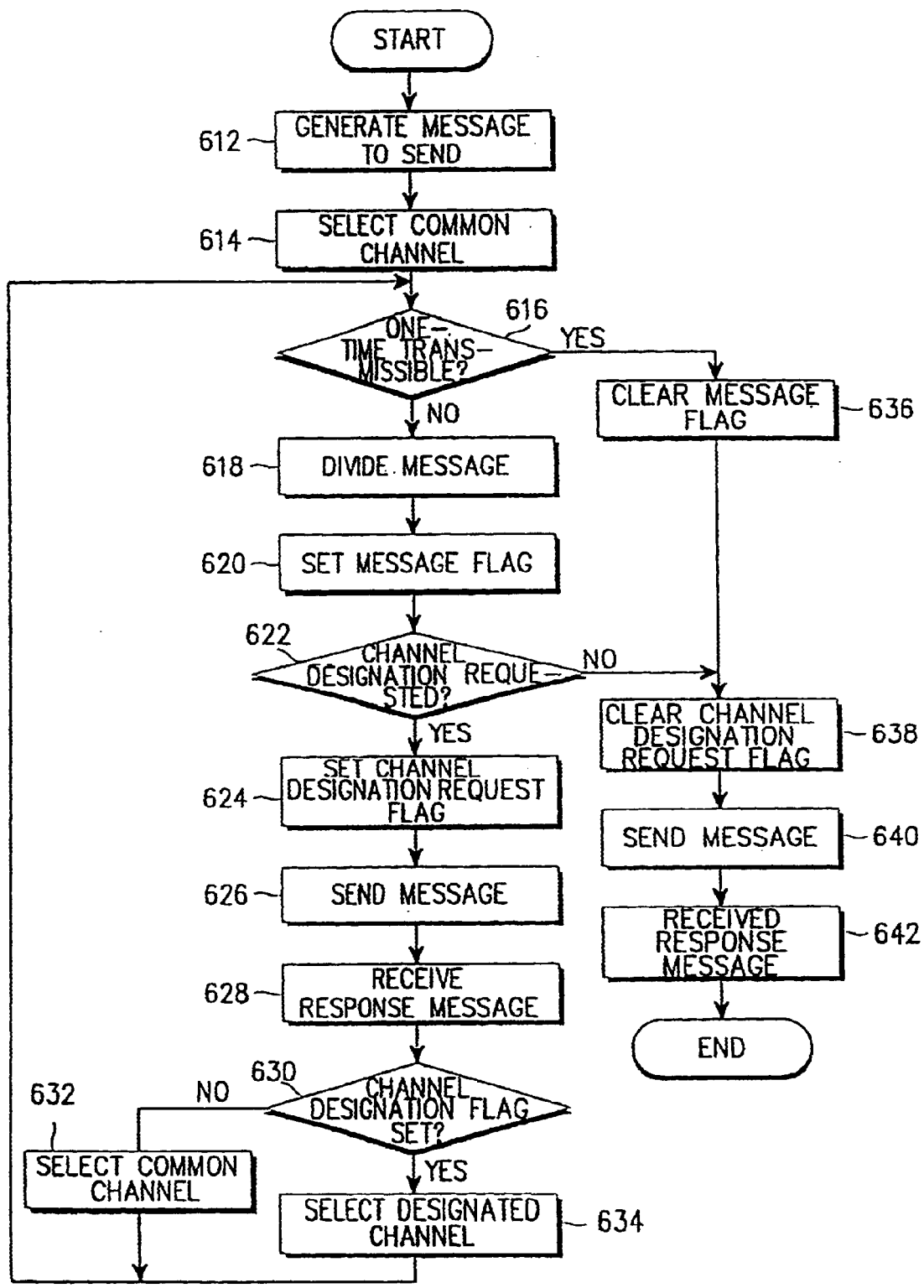
FIG. 6 is a flowchart of an MS operation for transmitting a message on a common channel according to the embodiment of the present invention.

FIG. 4 is a block diagram of an MS for transmitting an access channel message according to an embodiment of the present invention, and FIG. 6 is a flowchart illustrating the transmission of an access channel message from the MS of FIG. 4.

Figure 5:
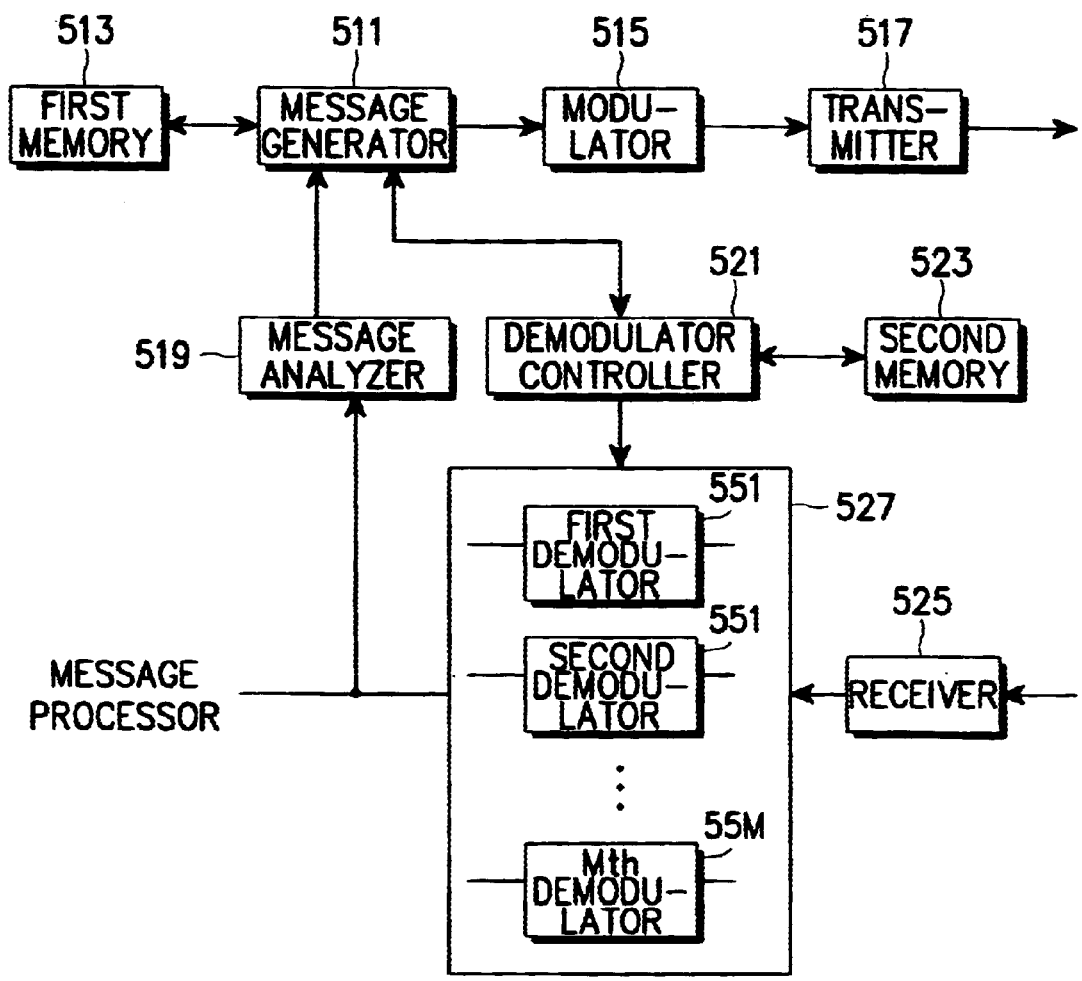
FIG. 5 is a block diagram of a BS according to the embodiment of the present invention.
Figure 7:
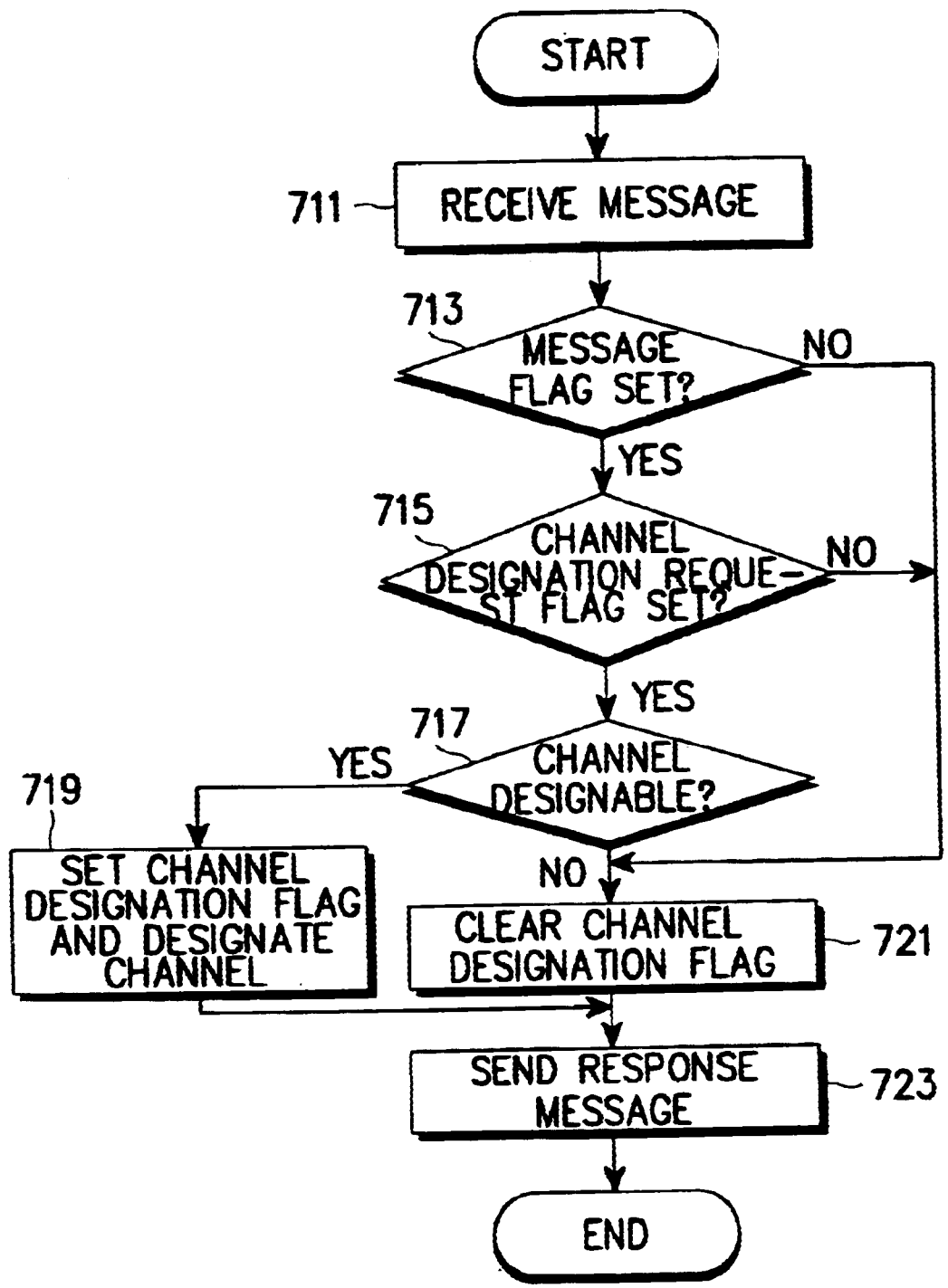
FIG. 7 is a flowchart of a BS operation for transmitting a message on a common channel according to the embodiment of the present invention.

FIG. 5 is a block diagram of a BS for generating a control message in response to a message received from the MS, and FIG. 7 is a flowchart illustrating the transmission of a control message from the BS of FIG. 5.

Referring to FIG. 4, a receiver 411 in the MS converts an RF signal received through an antenna to a baseband signal, and a demodulator 413 demodulates the baseband signal to an original signal. A message processor 415 generates an access channel message. A message analyzer 417 converts the access channel message into a format shown in FIG. 3A by analyzing its length. The message analyzer 417 also generates a long code ID for an assigned channel by analyzing the fields of the control message received from the demodulator 413, shown in FIG. 3B.

A memory 423 stores long code IDs for designating a channel. The long code IDs can be long code information to designate access channels as dedicated channels. A long code controller 421 determines what long code to generate by referring to the long code ID received from the message analyzer 417 and the long code IDs stored in the memory 423. If no long code ID is received from the message analyzer 417, the long code controller 421 selects one of the long code IDs from among the common access channels stored in the memory 423. In the case where the first access channel message segment is to be transmitted or no long code ID is generated from the message analyser 417, the long code controller 421 outputs a long code ID selected from among those stored in the memory 423. Otherwise, if a long code ID is generated from the message analyzer 417 or a message segment other than a first message segment is to be transmitted, the long code controller 421 causes the long code of an access channel corresponding to the long code ID to be generated. A long code generator 425 generates the corresponding long code under the control of the long code controller 421.

Therefore, the long code IDs stored in the memory 423 can be for common access channels shared by a plurality of MSes and the long code ID output from the message analyser 417 is one for allowing a specific MS or a few MSes to use an access channel as dedicated or semi-dedicated.

A channel encoder and orthogonal modulator unit 419 subjects the reverse access channel message received from the message analyzer 417 to channel encoding, repetition, interleaving, and orthogonal spreading. Multipliers 427 and 429 multiply the long code received from the long code generator 425 by PN sequences PNI and PNQ, respectively. A PN spreader 431 multiplies the I channel and Q channel PN sequences received from the multipliers 427 and 429 by the orthogonally spread signal received from the channel encoder & orthogonal modulator 419. A transmitter 433 converts the spread access channel message received from the PN spreader 431 to an RF signal prior to transmission.

In operation, the receiver 411 in the MS receives an RF signal from the BS, and the demodulator 413 generates a control message by subjecting the received signal to despreading and decoding. Then, the message analyzer 417 extracts a channel designation flag and a long code ID (i.e., channel ID) for channel designation from the control message of FIG. 3B, analyzes the fields, and controls the long code controller 421 based on the analysis.

The long code controller 421 determines a long code in accordance with the following procedure. In the presence of a long code ID assigned by the BS, the long code controller 421 controls a long code corresponding to the long code ID to be generated. If the BS does not assign a long code ID, or if an access attempt fails for a long code ID received from the BS via the MS message analyzer 417, the long code controller 421 randomly selects a long code ID by a random number generation function randomly selecting from among available long code IDs stored in the memory 423. The random number generation function generator resides in the long code controller 421.

Now turning to FIG. 5 there is illustrated a block diagram of the structure of a base station according to an embodiment of the present invention The BS includes a message generator 511 for generating a control message including long code ID information to designate a channel on which to send an access channel message. A modulator 515 modulates the control message and a transmitter 517 converts the modulated signal to an RF signal prior to transmission. The message generator 511 feeds the long code ID to a demodulation controller 521. The demodulation controller 521 controls a demodulation unit 527 based on the long code ID information to demodulate a signal received from a receiver 525. A first memory 513 stores the long code IDs assigned to MSs in current use, as listed below in Table 1, and a second memory 523 stores the long codes, as listed in Table 2, used by respective demodulators 551 to 55M in the demodulation unit 527. The message generator 511 refers to the information stored in the first and second memories 513 and 523 in generating a control message.

TABLE 1

| MS ID | long code ID |
| --- | --- |
| mobile 1 | long code 1, 10, 25, . . . |
| mobile 2 | long code 10, . . . |
| mobile 3 | long code 11, . . . |
| - | - |
| - | - |
| - | - |

TABLE 2

| demodulator No. | long code ID | dedicated/common |
| --- | --- | --- |
| demodulator 1 | long code 1 | dedicated |
| demodulator 2 | long code 30 | common |
| demodulator 3 | long code 11 | common |
| - | - | - |
| - | - | - |
| - | - | - |

As illustrated in Table 1, the first memory 511 stores long code IDs currently assigned to MSs within a coverage area of the BS, and the second memory 523 stores the long code IDs in current use by the demodulators 551 to 55M as shown in Table 2. The message generator 511 determines an available long code ID based on the long code ID information of the first memory 521 and loads the long code ID on a control message. The demodulation controller 521 receives access channel message information from the message generator 511 and assigns long codes for despreading to the demodulators 551 to 55M, to thereby reliably demodulate a signal received from the receiver 525.

An access channel message transmission from the MS of FIG. 4 to the BS of FIG. 5 will be described in detail with reference to FIGS. 6 and 7.

Upon reception of an access channel message from the message processor 415 of the MS in step 612, the message analyser 417 controls the long code controller 421 to select a common access channel in step 614. Then, the long code controller 421 reads a long code ID for the selected common access channel from the memory 413 and outputs the long code ID to the long code generator 425. In step 616, the message analyser 417 determines whether the access channel message can be sent at one time by comparing its length with the maximum length of a one-time transmissible message. If the access channel message is transmissible at one time, the message analyser 417 generates an access channel message having a message flag and a channel designation request flag cleared, in steps 636 and 638. Then, the access channel message is subject to necessary subsequent processing and transmitted in step 640. The MS awaits a response message from the BS in step 642. In this case, the access channel message is sent on the common access channel, notifying the BS that there is no additional message segments to be sent and a channel designated by the BS is not required in this circumstance. That is, a channel designation is not required because the message length is sufficiently small to be transmitted in one time interval.

If the access channel message is too long to be sent at one time in step 616, the message analyzer 417 divides the access channel message into segments each segment being transmissible at one time, in step 618. In step 620, the message analyzer 417 sets a message flag to indicate that there is a following message segment to be sent, and in step 622, it determines whether to use a channel designated through user manipulation or internal parameters by the BS, for transmission of the consecutive access channel message segments. If the MS does not intend to use the designated channel, it clears a channel designation request flag in step 638. In steps 640 and 642, the MS sends the access channel message segment and awaits a response message from the BS. This implies that the next access channel message segment will be sent on a common access channel instead of a channel designated by the BS.

Yet, if the MS intends to send the consecutive access channel message segment on a channel designated by the BS in step 622, the message analyzer 417 sets the channel designation request flag in step 624, which implies that the next message segment will be sent on the channel designated by the BS. In step 626, the access channel message segment is sent through the channel encoder & orthogonal spreader 419, the PN spreader 431, and the transmitter 433. Upon reception of a response message as shown in FIG. 3B from the BS in step 628, the message analyzer 417 checks the channel designation flag of the response message to determine whether there is a designated channel available to the MS, in step 630. If the channel designation flag is cleared, the message analyzer 417 determines that there is no available channel to be designated as dedicated for transmission of the next access channel message segment, and feeds information for selecting a common access channel to the long code controller 421 in step 632. If the channel designation flag is set, the message analyzer 417 determines that the BS designated a channel as dedicated to the MS and outputs a long code ID corresponding to the designated channel to the long code controller 421, in step 634. Then, the long code controller 421 outputs the long code ID of the designated channel to the long code generator 425, so that the MS can send the access channel message shown in FIG. 3A on the designated channel.

In the above operation, if there is an access channel message to be consecutively transmitted, the MS requests designation of a channel by setting a channel designation request flag and determines whether the requested channel is designated or not by checking the channel designation flag of a control message received from the BS. In sending the last message segment, the MS clears the message flag and the channel designation request flag.

Referring to FIG. 7, upon reception of an access channel message from the MS in step 711, the message analyzer 519 of the BS determines whether there is a following access channel message to receive from the MS by checking the message flag of the received access channel message, in step 713. If the message flag is cleared, indicating that the currently received message is the last one, the message analyzer 519 clears a channel designation flag in step 721 and outputs a response message as shown in FIG. 3B to the modulator 515. The cleared channel designation flag keeps the MS from accessing a designated channel.

If the message flag is set in step 713, the message analyzer 519 checks the channel designation flag of the received access channel message in step 715. If the channel designation request flag is cleared, the message generator 511 generates a response message having the channel designation flag cleared, in steps 721 and 723. If the channel designation request flag is set, the message generator 511 determines whether there is an available long code ID for designating a channel, referring to the long code IDs currently being occupied from the first memory 513. In the absence of an available long code ID, the message generator 511 clears the channel designation flag to notify the MS that the channel designation request cannot be acknowledged in step 721 and sends the response message in step 723.

In the presence of an available long code ID in step 717, the message generator 511 sets the channel designation flag and loads the available long code ID in a response message in step 719 and sends the response message in step 723.

As described above, the BS determines whether there is another message to receive from the MS by analyzing the message flag of an access channel message, upon reception of the access channel message. If there is an access channel message to be consecutively received, the BS determines whether the MS requests designation of a channel on which to send a subsequent message segment by analyzing the channel designation request flag of the received access channel message. Upon request of channel designation, the BS sends a response message having a channel designation flag set if there is an available long code ID for the channel designation, and the long code ID. This procedure is repeated whenever a message is received and a currently designated channel can be identical to or different from the most recently designated channel. That is, the BS can designate the same channel if the previous designated channel is available for access channel message transmission, and select another channel if it is not available.

In summary, whenever a message from a mobile station is sent from a mobile station, and that message is to long to be transmitted in a single transmission interval, the MS proceeds by dividing the message into a plurality of message segments {m1,m2,m3 . . . etc.}. The MS sends the first message segment, m1, on a common channel along with a message flag set and a channel designation flag set to indicate to a base station BS that the message is comprised of a number of segments and must be transmitted in consecutive time intervals. BS. The BS, in response to being informed of the multiple segment message, BS sends a response message to the MS with a channel designation flag and a channel ID set if it is able to accomodate the MS request for a designated channel. Otherwise, the BS must inform the MS that a channel designation is not feasible at that time by sending a response message to the MS with a channel designation flag and a channel ID cleared. If the BS is able to accommodate the MS by designating a channel then the transmission of all subsequent message segments (i.e. m2,m3,m4 . . . etc.) will occur on the designated channel.

The present invention advantageously minimizes message loss caused by message contention between mobile stations, increases the transmission efficiency of a common channel message, and rapidly performs a message transmission.

While the present invention has been described in detail with reference to the specific embodiment, it is a mere exemplary application. For example, though the description of the present invention is confined to a long common channel message transmission from an MS to a BS, the same operation in the reverse direction is also valid. Thus, it is to be clearly understood that many variations can be made by anyone skilled in the art within the scope and spirit of the present invention.

What is claimed is:

1. A common channel message communicating device in a mobile station (MS) of a CDMA communication system, comprising:
    a channel receiver for receiving a message including a channel ID on a forward common channel;
    a message generator for generating a reverse common channel message;
    a message processor for adding a channel designation request to the reverse common channel message and processing the channel ID of the received message;
    a spreading code generator for generating a spreading code based on the received channel ID; and
    a channel transmitter for spreading the reverse common channel message by the spreading code and transmitting the spread message.

2. The common channel message communicating device of claim 1, wherein the message processor adds the channel designation request to the reverse common channel message for those messages whose length exceeds the capacity for a single transmission.

3. The common channel message communication device of claim 2, wherein the adding of a channel designation request to the reverse common channel message by the message processor comprises:
    loading information indicating the presence of a subsequent message segment as part of a reverse common channel message by the message processor;
    dividing the reverse common channel message into multiple segments;
    outputting a message segment including a "more message" indicator for indicating additional message segments; and
    outputting a channel designation request to the channel transmitter.

4. The common channel message communicating device of claim 1, wherein if a designated channel ID is not included in the received message, the message processor assigns a spreading code for a common channel and outputs the spreading code to the spreading code generator.

5. The common channel message communicating device of claim 1, wherein the channel ID is included for designating a channel on which the mobile station (MS) can communicate with a base station (BS) without message contention from other mobile stations of the CDMA system.

6. The common channel message communicating device of claim 5, wherein the channel ID is a public long code generated with an ESN (Electronic Serial number) of the MS.

7. The common channel message communicating device of claim 5, wherein the channel ID is a long code used to designate a channel on which the MS can transmit the message on the reverse common channel.

8. The common channel message communicating device of claim 1, wherein:
    the message processor controls the spreading code of a common channel to be generated for the first message segment; and
    the message processor controls the spreading code of a designated channel to be generated for a subsequent message segment.

9. A common channel message communicating device in a base station (BS) of a CDMA communication system, comprising:
    a channel receiver for receiving a message on the reverse common channel;
    a message generator for generating a message including a designated channel ID, responsive to a channel designation request included with said message, said designated channel ID for assigning a channel spreading code to a reverse common channel message; and
    a channel transmitter for transmitting the message on the forward common channel.

10. The common channel message communicating device of claim 9, wherein the channel ID represents information for designating a channel on which a mobile station (MS) can communicate with the BS.

11. The common channel message communicating device of claim 10, wherein the channel ID is a public long code generated with an Electronic Serial Number (ESN) of an MS.

12. The common channel message communicating device of claim 10, wherein the channel ID is a long code used to designate a channel on which an MS can transmit the message on the reverse common channel.

13. A common channel message communicating method in a mobile station (MS) of a CDMA communication system, comprising the steps of:
    (1) generating a reverse common channel message;
    (2) analyzing the reverse common channel message and sending the reverse common channel message with a channel designation request; and
    (3) generating a spreading code corresponding to a designated channel ID included in a message received on a forward common channel, spreading a reverse common channel message by the spreading code, and sending the spread message on a designated channel.

14. The common channel message communicating method of claim 13, wherein a channel designation is requested at step (2) when the length of the reverse common channel message requires at least two transmissions.

15. The common channel message communicating method of claim 14, wherein the message is divided into a plurality of message frames and a message frame is sent with information indicating the presence of a subsequent message frame at step (3).

16. The common channel message communicating method of claim 15, wherein if channel ID information is not included in the received message at step (3), a spreading code for a reverse common channel is generated.

17. The common channel message communicating method of claim 14, wherein the channel ID represents information for designating a channel on which the MS can communicate with the base station (BS) without message contention from other mobile stations.

18. The common channel message communicating method of claim 17, wherein the channel ID represents use of a public long code generated with an electronic serial number (ESN) of the MS.

19. The common channel message communicating method of claim 17, wherein the channel ID is a long code used to designate a channel on which the MS can transmit the message on the reverse common channel.

20. The common channel message communicating method of claim 13, wherein the channel designation request is added to a first reverse common channel message, and the resulting message is spread by a spreading code for a reverse common channel for transmission, at step (3).

21. A common channel message communicating method in a base station (BS) of a CDMA communication system, comprising the steps of:

receiving a message on a reverse common channel;

generating a message including a channel ID for designating a channel in which a mobile station (MS) can send the reverse common channel message, if the received message has a channel designation request; and transmitting the generated message on a forward common channel.

22. The common channel message communicating method of claim 21, wherein the channel ID is information for designating a channel on which the MS can communicate with the BS thereby preventing message contention with other mobile stations.

23. The common channel message communicating method of claim 22, wherein the channel ID is a public long code generated with the electronic serial number (ESN) of the MS.

24. The common channel message communicating method of claim 22, wherein the channel ID is a long code used to designate a channel on which the MS can transmit the message on the reverse common channel thereby preventing message contention with other mobile stations.

* * * * *